United States Patent [19]

Weber et al.

[11] Patent Number: 5,342,856
[45] Date of Patent: Aug. 30, 1994

[54] PROCESS FOR PRODUCING INTEGRAL SKIN MOLDED FOAMS

[75] Inventors: Christian Weber; Hartwig Grammes, both of Leverkusen, Fed. Rep. of Germany

[73] Assignee: Bayer Aktiengesellschaft, Leverkusen, Fed. Rep. of Germany

[21] Appl. No.: 908,700

[22] Filed: Jul. 2, 1992

[30] Foreign Application Priority Data

Jul. 11, 1991 [DE] Fed. Rep. of Germany ....... 4122872

[51] Int. Cl.$^5$ ................... C08J 9/08; C08K 5/09
[52] U.S. Cl. ....................... 521/51; 521/125; 521/128; 521/129; 521/159; 521/163; 521/176; 264/45.5; 264/51; 264/54; 264/328.1; 264/328.6; 264/328.8
[58] Field of Search ............... 521/51, 125, 128, 159, 521/163, 176; 264/51, 54, 328.1, 328.6, 328.8, 45.5

[56] References Cited

U.S. PATENT DOCUMENTS

| | | | |
|---|---|---|---|
| 3,726,952 | 4/1973 | Boden et al. | 521/51 |
| 4,256,847 | 3/1981 | Spector | 521/125 |
| 4,305,991 | 12/1981 | Meyborg et al. | 521/125 |
| 4,442,236 | 4/1984 | Rasshofer et al. | 521/125 |
| 4,519,965 | 5/1985 | Taylor et al. | 521/125 |
| 4,581,386 | 4/1986 | Taylor et al. | 521/125 |
| 4,585,803 | 4/1986 | Nelson et al. | 521/125 |
| 4,636,531 | 1/1987 | Schmidt et al. | 521/51 |
| 4,753,966 | 6/1988 | Haas et al. | 521/51 |
| 4,764,537 | 8/1988 | Horn et al. | 521/51 |
| 4,766,172 | 8/1988 | Weber et al. | 524/783 |
| 4,868,224 | 9/1989 | Harasin et al. | 521/159 |
| 4,876,019 | 10/1989 | Meyer et al. | 521/51 |
| 4,895,879 | 1/1990 | Nelson et al. | 521/125 |
| 5,008,033 | 4/1991 | Meyer et al. | 521/51 |
| 5,011,647 | 4/1991 | Meyer et al. | 521/51 |
| 5,043,382 | 8/1991 | Meyer et al. | 521/51 |
| 5,057,544 | 10/1991 | Ho et al. | 521/51 |
| 5,070,110 | 12/1991 | Carswell et al. | 521/163 |
| 5,071,881 | 12/1991 | Parfondry et al. | 521/51 |
| 5,132,329 | 7/1992 | Lynch et al. | 521/51 |
| 5,135,962 | 8/1992 | Lau et al. | 521/163 |
| 5,166,183 | 11/1992 | Franyutti et al. | 521/51 |
| 5,216,035 | 6/1993 | Harrison et al. | 521/51 |
| 5,234,961 | 8/1993 | Tanis | 521/51 |
| 5,236,960 | 8/1993 | Harrison et al. | 521/51 |
| 5,236,961 | 8/1993 | Ho et al. | 521/51 |
| 5,254,597 | 10/1993 | Horn et al. | 521/51 |
| 5,266,234 | 11/1993 | Ho et al. | 521/51 |
| 5,284,880 | 2/1994 | Harrison et al. | 521/51 |

FOREIGN PATENT DOCUMENTS

| | | |
|---|---|---|
| 1277471 | 12/1990 | Canada . |
| 119471 | 9/1984 | European Pat. Off. . |
| 1196864 | 7/1965 | Fed. Rep. of Germany . |
| 3904812 | 8/1990 | Fed. Rep. of Germany . |

*Primary Examiner*—John Kight, III
*Assistant Examiner*—Rabon Sergent
*Attorney, Agent, or Firm*—Joseph C. Gil; N. Denise Brown

[57] ABSTRACT

The use of solutions of zinc carboxylates having 8 to 24 carbon atoms in aliphatic polyamines having molecular weights of from 131 to 500 having a total of 2 or 3 primary, secondary and/or tertiary amine nitrogen atoms as additives for the formation of a compact surface in the production of molded foams having a maximum gross density of 500 kg/m$^3$ from organic polyisocyanates, polyether polyols, chain lengthening agents, water and optionally other auxiliary agents and additives.

8 Claims, No Drawings

PROCESS FOR PRODUCING INTEGRAL SKIN MOLDED FOAMS

BACKGROUND OF THE INVENTION

The present invention relates to the use of solutions of zinc salts of fatty acids in aliphatic and optionally aromatic polyamines as additives for producing a compact surface in the production of polyurethane based molded foams using water as the blowing agent.

The production of molded polyurethane foam products having a compact surface by foaming inside a mold is already known in the art (see, e.g., German Auslegeschrift 1,196,864). The known process is carried out by introducing a reactive and foamable mixture of organic polyisocyanates, compounds having isocyanate reactive groups and the usual auxiliary agents and additives into a mold in a larger quantity than would be required for filling the mold under conditions of unrestricted foaming, and then foaming up the mixture inside the mold. Both flexible and semi-rigid as well as rigid molded articles can thus be produced by suitable choice of the starting components, in particular by suitable choice of their molecular weights and functionality. The dense outer skin is obtained by introducing a larger quantity of foamable mixture into the mold than would be required for filling the volume of the mold under conditions of unrestricted foaming and by using fluorochlorohydrocarbons as blowing agents. These blowing agents condense on the internal wall of the mold under the prevailing temperature and pressure conditions so that the blowing reaction comes to a standstill on the internal wall of the mold and a compact outer skin is formed.

Apart from the above-mentioned physical blowing agents, water is used as chemical blowing agent in industrial polyurethane chemistry in the form of the carbon dioxide produced by the reaction between water and isocyanates. Although this chemical blowing agent can be used to produce polyurethane foams of excellent quality under conditions of unrestricted foaming, it is incapable of giving rise to high quality molded foams having a compact surface (integral foams). This is due to the fact that the carbon dioxide does not condense against the internal wall of the mold under the usual conditions and the blowing action is therefore not stopped in the skin zone.

The use of zinc salts as internal mold release agents for polyurethane elastomers is known in the art (see,- e.g., published European patent application 119,471, German Offenlegungsschrift 3,639,502, and U.S. Pat. Nos. 4,519,965, 4,581,386, 4,766,172 and 4,895,879).

DESCRIPTION OF THE INVENTION

It has now surprisingly been found, however, that high quality molded polyurethane foams having a compact surface can be produced from the conventional starting materials by using water without the above-mentioned physical blowing agents if the additives d) described below, which are essential for this invention and comprise solutions of zinc salts dl) in aliphatic polyamines d2) and optionally aromatic diamines f) are also used in the known process of foaming the usual starting materials inside molds.

More particularly, the invention relates to the improved process for the preparation of an integral skin foam having a maximum gross density of 500 kg/m$^3$ by foaming a reaction mixture in a closed mold, said reaction mixture comprising:
 a) one or more polyisocyanates having aromatically bound isocyanate groups,
 b) one or more polyether polyols having molecular weights of from 500 to 12,000, and containing from 2 to 4 alcoholic hydroxyl groups,
 c) one or more divalent or trivalent alcohol having molecular weights of from 62 to 499, and containing primary and/or secondary hydroxyl groups,
the improvement wherein the reaction mixture contains the following additional components:
 d) a solution of
  d1) 100 parts by weight of a zinc salt of a straight chain or branched chain, saturated or unsaturated fatty acid having from 8 to 24 carbon atoms in
  d2) from 40 to 200 parts by weight of an aliphatic polyamine having a molecular weight of from 131 to 500 and having a total of 2 to 4, preferably 2 to 3 primary, secondary and/or tertiary amine nitrogen atoms, and
 e) water,
and wherein the total amount of components is such that the isocyanate index is from 70 to 150.

In one preferred embodiment, the reaction mixture also includes f) one or more aromatic diprimary diamines having molecular weights of from 108 to 350. The diprimary diamine can be included as a separate component in the reaction mixture and/or can be included in the solution.

Although, as noted above, solutions of zinc salts of the type of additives a) required for this invention and their use for the production of polyurethane-based molded plastics have already been disclosed in numerous prior publications. According to these prior publications, such solutions are added solely for improving the self-releasing properties of the resulting moldings which will generally have densities above 0.8 g/cm$^3$ and are generally produced without blowing agents. In any case, the above-mentioned prior publications contain not the slightest hint of the surprising effect which has now been discovered. The additives d) and e) which are essential for this invention not only give rise to the formation of a compact surface but also result in improved mechanical properties of the moldings (e.g. less abrasion in the skin zone), uniform distribution of pigments (no streaks) and greater UV resistance in unlacquered moldings and improved lacquering.

Component d1) consists of at least one zinc salt of a linear or branched, optionally olefinically unsaturated fatty acid having 8 to 24, preferably 12 to 18 carbon atoms. The zinc salts mentioned in U.S. Pat. No. 4,519,965, column 3, lines 36 to 61, for example, are suitable for this purpose. The use of commercial zinc stearates are also preferred for this invention.

Component d2) consists of at least one aliphatic polyamine having a molecular weight of from 131 to 500 having a total of 2 to 4, preferably 2 to 3, primary, secondary and/or tertiary amine nitrogen atoms. Suitable compounds include, for example, the aliphatic polyamines recommended as solubilizers for zinc salts in the above-mentioned prior publications. Examples of particularly suitable compounds include the products of addition of 4 to 6 moles, preferably 5, of propylene oxide to ethylene diamine; polyether amines having terminal primary amino groups, such as, in particular, the products of amination (having molecular weights of from about 300 to 500) of propylene glycols, such as, for example, the polyether diamine supplied under the name of Jeffamine 400 by Texaco Company; bis-(3-dimethylaminopropyl)-amine; N-(2-dimethylaminoethyl)ethylene diamine; or mixtures of such polyamines. The solutions d) according to the invention contain from 40 to 200 parts by weight, preferably from 50 to 150 parts by weight of component d2) per 100 parts by weight of component d1).

The solutions d) required for the invention may contain f) aromatic diamines having molecular weights of from 108 to 350 in a quantity of up to 200 parts by weight, preferably up to 120 parts by weight, per 100 parts by weight of component d1). Aromatic diamines suitable for use as component f) include, for example, the compounds mentioned in European patent 81,701, column 5, lines 58 to column 6, line 34. Among these, the diamines mentioned there as preferred are also preferred for the present invention. 1-Methyl-3,5-diethyl-2,4-diaminobenzene and commercial mixtures thereof with 1-methyl-3,5-diethyl-2,6-diaminobenzene are also preferred as component f) for the invention.

Any polyisocyanates or polyisocyanate mixtures having aromatically bound isocyanate groups are suitable for use as polyisocyanate component a), for example the polyisocyanates mentioned in European patent 81,701, column 3, line 30 to column 4, line 25. Among these, the polyisocyanates mentioned there as preferred are also preferred for this invention. Particularly suitable polyisocyanate components are the polyisocyanates containing urethane groups obtainable, for example, by the reaction of 1 mol of 4,4'-diisocyanatodiphenylmethane with from 0.05 to 0.3 mol of polypropylene glycols having a molecular weight below 1000, preferably below 700; diisocyanates based on 4,4'-diisocyanatodiphenylmethane containing carbodiimide and/or uretoneimine groups; and mixtures of such modified diisocyanates. Polyisocyanate component a) preferably has an NCO content of from 20 to 30% by weight.

Component b) consists of polyether polyols known per se from polyurethane chemistry having 2 to 4 primary and/or secondary, preferably predominantly primary hydroxyl groups and molecular weights of from 500 to 12,000, preferably from 2000 to 8000. Polyether component b) preferably has an (average) hydroxyl functionality of from 2 to 3 and an (average) molecular weight of from 2000 to 8000. Polyethers modified by vinyl polymers such as may be obtained e.g. by the polymerization of styrene and acrylonitrile in the presence of polyethers (see, e.g., U.S. Pat. Nos. 3,383,351, 3,304,273, 3,523,093 and 3,110,695 or German patent 1,152,536) are often also used as part or all of component b). Polyether polyols containing high molecular weight polyadducts or polycondensates in a finely dispersed or dissolved form may also be used as all or part of component b).

The alcohols used as component c) dihydric or trihydric alcohols having molecular weights of from 62 to 499, and preferably from 62 to 200.

In addition, f) aromatic diprimary diamines having molecular weights range of from 108 to 300 may be included. These aromatic diamines may be included as a part of the solution d) or may be added as a separate component to the reaction mixture. If used, such diprimary diamines are used in amounts of up to 200 parts by weight per 100 parts of zinc salt d1).

The blowing agent e) used is water.

Auxiliary agents and additives g) which are optionally used are:
g1) other blowing agents free from CFC, e.g. organic carboxylic acids as described in published European patent application 372, 292 or salts of carboxylic acids as described in published European patent application 423,594.

The use of such blowing agents in addition to water is, however, not preferred.

Other auxiliary agents and additives which can be used are:
g2) the usual catalysts for the isocyanate polyaddition reaction, in particular organic tin compounds such as tin(II)-octoate and dibutyl tin dilaurate; potassium acetate; and aminic catalysts such as dimethylbenzylamine, triethylenediamine or permethylated hexamethylenediamine.

Stabilizers, flame retardants, pigments, fillers, internal mold release agents and the like are further examples of auxiliary agents and additives g) which can also be used.

The molded foams are preferably produced by first mixing the starting components b), c), d), e), and f) to form a "reactive component" or an "isocyanate reactive component" and then reacting this with polyisocyanate component a) while maintaining an isocyanate index of from 70 to 150, preferably from 90 to 110.

Component d) required for the invention is generally used in such a quantity that the "reactive component" contains from 0.2 to 2.5% by weight, preferably from 0.5 to 1.0% by weight of zinc salt d1), based on the weight of component b). Further, the total proportion of amine components d2), and f) generally amount to at most 20% by weight, based on the weight of component c). Component c) is used in quantities of 2 to 15% by weight, preferably 4 to 10% by weight, based on the weight of component b). The blowing agent e) required for this invention (water) is used in a quantity of from 0.2 to 2.0% by weight, depending on the desired density, preferably from 0.5 to 1.5% by weight, based on the weight of component b).

To combine the "reactive component" with the polyisocyanate component, the two components are mixed together, for example by means of stirrer mixers or preferably in conventional high pressure mixing apparatus as conventionally used for the production of polyurethane foams. As soon as the reaction mixture has been prepared it is introduced into the mold in a quantity adjusted to the required gross density of the molded product. The gross density of the molded product is at least 200 kg/m$^3$, preferably from 300 to 500 kg/m$^3$.

The temperature of the molds used is generally at least 30° C., preferably not less than 40° C. The temperature of the raw materials is generally adjusted to 20° to 40C., preferably 23° to 30° C. The internal walls of the molds are preferably coated with external mold release agents known per se before the reaction mixture is introduced.

The following Examples serve to illustrate the invention.

EXAMPLES

In the examples the following starting materials have been used:

Polyether

Polyether polyol having a molecular weight of 5000 prepared by the propoxylation of trimethylolpropane followed by ethoxylation of the propoxylation product (PO:EO ratio by weight=85:15).

Catalyst 1:

Bis-(3-dimethylaminopropyl)-amine

Catalyst 2:

Permethylated hexamethylene diamine

Black paste

Commercial carbon black paste

Additive 1:

Solution of 1 part by weight of commercial zinc stearate in 1 part by weight of the product of addition of 5 moles of propylene oxide to 1 mole of ethylene diamine.

Additive 2:

Solution of 1.8 parts by weight of commercial zinc stearate in 0.9 parts by weight of bis-(3-dimethyl-aminopropyl)-amine and 2.0 parts by weight of a mixture of 65% by weight of 1-methyl-3,5-diethyl-2,4-diaminobenzene and 35% by weight of 1-methyl-3,5-diethyl-2,6-diaminobenzene.

weight. The quantity of polyisocyanate used corresponds to an isocyanate index of 100 (isocyanate index=quotient of the number of isocyanate groups of the polyisocyanate component divided by the number of isocyanate reactive groups present in the reactive component, multiplied by 100).

Examples 1a) and 1b) are comparison examples as they do not contain the solutions which are essential for this invention. The foams obtained in these comparison examples have a substantially homogeneous density distribution without significant formation of a compact skin zone. Integral skin foams having a pronounced compact skin zone are obtained in all the Examples 2a) to 4b) according to the invention. Further details may be seen from the following Table 2.

The molds used in the examples were steel plate molds measuring 10×300×235 mm, the internal walls of which had previously been coated with a commercial mold release agent (Acmosil 180 ST, Manufacturer: Acmos, D-2800 Bremen 1). The starting components were mixed together in a conventional high pressure mixing apparatus. The quantity of reaction mixture introduced into the mold was in each case calculated to produce gross densities of 300 kg/m$^3$ and 500 kg/m$^3$.

TABLE 1

(composition of the formulations)

| | Example | | | | | | | |
|---|---|---|---|---|---|---|---|---|
| | 1a | 1b | 2a | 2b | 3a | 3b | 4a | 4b |
| polyether | 100 | 100 | 100 | 100 | 100 | 100 | 100 | 100 |
| ethyleneglycol | 5,5 | 5,5 | 5,5 | 5,5 | 5,5 | 5,5 | 5,5 | 5,5 |
| catalyst 1 | 0,5 | 0,5 | 0,5 | 0,5 | 0,5 | 0,5 | 0,5 | 0,5 |
| catalyst 2 | 0,5 | 0,5 | 0,5 | 0,5 | 0,5 | 0,5 | 0,5 | 0,5 |
| water | 1,0 | 1,0 | 1,0 | 1,0 | 1,0 | 1,0 | 1,0 | 1,0 |
| black paste | 5 | 5 | 5 | 5 | 5 | 5 | 5 | 5 |
| additive 1 | — | — | 1,5 | 1,5 | — | — | — | — |
| additive 2 | — | — | — | — | 1,5 | 1,5 | — | — |
| additive 3 | — | — | — | — | — | — | 1,5 | 1,5 |
| polyisocyanate | 51 | 51 | 52 | 52 | 52 | 52 | 51 | 51 |

(all figures relate to parts by weight)

TABLE 2

| | Example | | | | | | | |
|---|---|---|---|---|---|---|---|---|
| | 1a | 1b | 2a | 2b | 3a | 3b | 4a | 4b |
| gross density (kg/m$^3$) | 300 | 490 | 308 | 507 | 311 | 505 | 312 | 492 |
| gross density of the skin (3 mm) (kg/m$^3$) | 305 | 526 | 355 | 555 | 342 | 549 | 336 | 547 |
| tensile strength (MPa) | 1,4 | 2,7 | 1,6 | 3,2 | 1,8 | 3,6 | 1,4 | 3,0 |
| elongation at break (%) | 166 | 153 | 171 | 180 | 187 | 207 | 139 | 200 |
| tear propagation resistance (kN/m) | 3,1 | 5,4 | 3,7 | 6,4 | 4,3 | 7,3 | 4,0 | 6,7 |
| shore hardness A | 30 | 53 | 31 | 55 | 34 | 57 | 35 | 51 |
| thermal abrasion | — | — | + | + | + | ++ | + | ++ |

Additive 3:

Solution of 1 part by weight of commercial zinc stearate in 1 part by weight of a commercial diaminopolyether having a molecular weight of 400 prepared by the amination of the corresponding polypropylene glycol (Jeffamine 400 of Texaco Company).

Polyisocyanate:

Polyisocyanate mixture having an isocyanate content of 26.5% by weight, consisting of a mixture of equal parts by weight of (i) the reaction product of 4,4'-diisocyanatodiphenylmethane with tripropylene glycol at an NCO/OH equivalent ratio of 4:1 and (ii) a 4,4'-diisocyanatodiphenylmethane modified by partial carbodiimidization.

The figures given in the following Table referring to the composition of the formulations denote parts by As demonstrated by comparing the gross density of the moulded products with the gross density of a (peeled off) skin of a thickness of 3 mm, there was a considerable difference in the gross density of the examples of the invention. A 3 mm skin was also tested for tensile strength, elongation at break and tear propagation resistance and the values obtained clearly demonstrated the positive effect of the additives of the invention.

Thermal abrasion was determined by subjecting specimens measuring 60×40×10 mm to different periods of abrasion using an abrasive disc (diameter 100 mm, width 31 mm) coated with Merino wool felt. The degree of abrasion of the specimens was assessed visually at the end of the tests. Whereas the comparison examples displayed pronounced indentations as a result of abrasion of the surface material, the examples of the invention displayed considerably less abrasion.

What is claimed is:

1. In a process for the preparation of an integral skin foam having a maximum gross density of 500 kg/m$^3$ by foaming a reaction mixture in a closed mold in the absence of physical blowing agents, said reaction mixture comprising:
   a) one or more polyisocyanates having aromatically bound isocyanate groups,
   b) one or more polyether polyols having molecular weights of from 500 to 12,000 and containing from 2 to 4 alcoholic hydroxyl groups,
   c) one or more divalent or trivalent alcohols having molecular weights of from 62 to 499, and containing primary and/or secondary hydroxyl groups,
the improvement wherein said reaction mixture contains the following additional components:
   d) a solution of
      d1) 100 parts by weight of a zinc salt of a straight chain or branched chain, saturated or unsaturated fatty acid having from 8 to 24 carbon atoms in
      d2) from 40 to 200 parts by weight of an aliphatic polyamine having a molecular weight of from 131 to 500 and having a total of 2 to 4 primary, secondary and/or tertiary amine nitrogen atoms, and
   e) water,
and wherein the total amount of said zinc salt is from 0.2 to 2.5% by weight, based on the weight of component b), and the total amount of components is such that the isocyanate index is from 70 to 150.

2. The process of claim 1, wherein said reaction mixture also includes f) one or more aromatic diprimary diamines having molecular weights of from 108 to 350, wherein said diprimary diamine can be included as a separate component in said reaction mixture and/or can be included in said solution.

3. The process of claim 2, wherein said component f) is included in said solution in an amount of no more than 200 parts by weight.

4. The process of claim 3, wherein said component f) is also included in said reaction mixture as a separately added component.

5. The process of claim 4, wherein the amount of components used is as follows:
   component c): from 2 to 15% by weight, based on the weight of component b),
   component d1): from 0.2 to 2.5% by weight, based on the weight of component b),
   component d2) and component f): no more than 20% by weight, based on the weight of component c), and
   component e): from 0.5 to 1.5% by weight, based on the weight of component b).

6. The process of claim 2, wherein the total amount of components d2) and f) is no more than 20% by weight, based on the weight of component c).

7. The process of claim 2, wherein component c) is used in an amount of from 2 to 15% by weight, based on the weight of component b).

8. The process of claim 2, wherein component e) is used in an amount of from 0.5 to 1.5% by weight, based on the weight of component b).

* * * * *